United States Patent [19]
Naito et al.

[11] Patent Number: 6,038,121
[45] Date of Patent: Mar. 14, 2000

[54] MONOLITHIC CAPACITOR

[75] Inventors: Yasuyuki Naito, Takefu; Yoichi Kuroda, Fukui; Masaaki Taniguchi, Fukui-ken; Haruo Hori; Takanori Kondo, both of Sabae, all of Japan

[73] Assignee: Murata Manufacturing Co., Ltd., Japan

[21] Appl. No.: 09/234,385

[22] Filed: Jan. 20, 1999

[30] Foreign Application Priority Data

Oct. 6, 1998 [JP] Japan .................................. 10-284292

[51] Int. Cl.$^7$ .............................. H01G 4/228; H01G 2/20
[52] U.S. Cl. .................. 361/303; 361/306.1; 361/308.1; 361/310
[58] Field of Search .................. 361/303, 306.1, 361/306.3, 307, 308.1, 305, 310, 311–313, 321.2, 329, 328; 29/25.41, 25.42

[56] References Cited

FOREIGN PATENT DOCUMENTS 2-256216  10/1990  Japan .
6260364  6/1994  Japan .

Primary Examiner—Kristine Kincaid
Assistant Examiner—Anthony Dinkins
Attorney, Agent, or Firm—Ostrolenk, Faber, Gerb & Soffen, LLP

[57] ABSTRACT

The present invention is to provide a monolithic capacitor for reducing an equivalent series inductance of a monolithic capacitor. The external terminal electrodes are respectively provided on four corners of the capacitor body. External terminal electrodes can also be provided on the side surfaces of the capacitor body. The first inner electrode is connected to two adjacent external corner terminal electrodes and preferably to the external side terminal electrode. The second inner electrode faces the first electrode through a dielectric layer and is connected to other two adjacent external corner terminal electrodes as well as to the external side terminal electrode. The current flowing through the inner electrodes is directed to a variety of directions, and since the current flow in the corner parts of the inner electrodes is smooth, the magnetic fluxes generated in association with the current are cancelled out, thereby reducing the equivalent series inductance.

17 Claims, 10 Drawing Sheets

MONOLITHIC CAPACITOR

BACKGROUND OF THE INVENTION

1. Field of the Invention

The present invention relates to a monolithic capacitor, and more particularly to a monolithic capacitor that may be advantageously used in a high frequency circuit.

2. Description of the Related Art

A monolithic capacitor for use in a high frequency circuit is described in JP 2-256216 A and shown in FIGS. 9A and 9B. FIG. 9A is a plane view showing a first cross-section of the monolithic capacitor 1 and FIG. 9B is a plane view showing a second cross-section of the monolithic capacitor 1 that is different from the first cross-section.

The monolithic capacitor 1 includes a capacitor body 6 having first and second opposing principle surfaces which are rectangular in shape, and four planar side surfaces 2, 3, 4 and 5 extending therebetween. The capacitor body 6 includes a plurality of dielectric layers 7 each lying in a plane which generally extends parallel to the outer main surfaces. The dielectric layers are made, for example, of a ceramic dielectric. At least one pair of first and second inner electrodes 8 and 9, facing each other and separated by a respective dielectric layer 7, are formed in the capacitor body 6 so as to form a capacitor unit. The inner electrodes are also planar and rectangular in shape. As used herein, the term "capacitor unit" refers to a minimum unit in which a capacitance is formed by the pair of the inner electrodes 8 and 9 separated by a respective dielectric layer.

This monolithic capacitor 1 is constructed to reduce an equivalent series inductance (ESL), so as to be applicable for a use in a high frequency range.

Four first lead electrodes 10, 11, 12 and 13 extend from the first inner electrode 8 to the side surfaces 2 and 4. Particularly, lead electrodes 10 and 11 extend to the side surface 2, and lead electrodes 12 and 13 extend to the side surface 4. First external terminal electrodes 14, 15, 16 and 17 are electrically connected to lead electrodes 10, 11, 12 and 13, respectively.

In a similar manner, four second lead electrodes 18, 19, 20 and 21 extend from second inner electrode 9 to the side surfaces 2 and 4. Particularly, the lead electrodes 18 and 19 extend to the side surface 2, but at locations that are different from the locations where the first lead electrodes 10 and 11 extend, and lead electrodes 20 and 21 extend to the side surface 4, but at locations that are different from the locations where the first lead electrodes 12 and 13 extend. Second external terminal electrodes 22, 23, 24 and 25 are electrically connected to lead electrodes 18, 19, 20 and 21, respectively. As a result, external terminal electrodes 22 and 23 are positioned at locations which are different from the locations of external electrodes 14 and 15 on the side surface 2, and the external terminal electrodes 24 and 25 are positioned at locations which are different from those of the first external electrodes 16 and 17 on the side surface 4. With this structure, the plurality of first external terminal electrodes 14–17 and the plurality of second external terminal electrodes 22–25 are alternately disposed side by side.

In FIG. 9A, typical paths and directions of a currents that flow in monolithic capacitor 1 at a given point of time are illustratively shown with arrows. In the state illustrated, the current is flowing from each of the first external terminal electrodes 14–17 toward each of the second external terminal electrodes 22–25. In case of an alternating current, the current flow will reverse direction with the changing polarity of the alternating current.

As current flows through the inner electrodes, a magnetic flux self-inductance component is induced. The direction of the various components of magnetic flux is determined by the direction of the respective components of current.

Referring to FIG. 9A, since the currents flow in multiple directions with a spread of an approximately 180 degrees at the centers of the inner electrodes 8 and 9 as well as at the respective neighborhoods of the relatively centrally located lead electrodes 11, 13, 18 and 20, the various components of magnetic flux are cancelled out, thereby reducing the ESL.

However, since the various components of current do not easily flow at the locations where the lead electrodes do not exist, that is, at the portion of the inner electrodes 8 located adjacent side surface 3 and the portion of the inner electrode 9 located adjacent the side surface 5, there is minimal canceling of magnetic flux in these areas and the desired reduction in ESL is not achieved.

To overcome this problem, one might increase the number of lead electrodes and associated external terminal electrodes. However it is difficult, if not impossible, to increase the number of the external terminal electrodes in view of the dimensional restriction of the monolithic capacitor, and thus this measure is not always adopted. Also, an increase in the number of external terminal electrodes creates a problem in mounting the monolithic capacitor because it is not always possible to form a large number of lands on a circuit board for connecting these external terminal electrodes to the circuit board.

Another known monolithic capacitor designed for use in a high frequency circuit is described in Japanese Examined Patent Publication No. 4-70764 and shown in FIGS. 10A and 10B. FIG. 10A is a plane view showing a first cross-section of the monolithic capacitor 26 and FIG. 10B is a plane view showing a second cross-section that is different from the first cross-section. The first cross-section is located in a plane where a first inner electrode 33 lies. The second cross-section is located in a plane were a second inner electrode 34 lies.

The monolithic capacitor 26 includes a capacitor body 31 having two rectangular principle surfaces which face one another, and four side-surfaces 27, 28, 29 and 30 extending therebetween. The capacitor body 31 includes a plurality of dielectric layers 32 which lie in respective planes extending parallel to the principle surfaces. At least one pair of first and second inner electrodes 33 and 34, facing each other through a respective dielectric layer 32, are provided to form a capacitor unit.

A first external terminal electrode 36 is provided on a corner 35 of the capacitor body 31 where the two adjacent side surfaces 28 and 29 intersect, and a second external terminal electrode 38 is provided on a corner 37 of the capacitor body 31 where the two adjacent side surfaces 27 and 28 intersect. The corners 35 and 37 are adjacent one another.

The first inner electrode 33 includes a first lead electrode 39 that extends to corner 35, so as to be electrically connected to a first external terminal electrode 36. An angular notch is formed in the upper right hand corner of electrode 33 which is adjacent to the corner 35. The second inner electrode 34 includes a second lead electrode 40 that extends to corner 37, so as to be electrically connected to a second external terminal electrode 38. An angular notch is formed in the lower right hand corner of electrode 34 which is adjacent to corner 37.

In FIG. 10A, typical paths and directions of a current that flows in monolithic capacitor 36 is illustratively shown with an arrow. At the instant shown, the currents flow from the first external terminal electrode 36 toward the second external terminal electrode 38. Since the currents path turns back upon itself (reversing by approximately 180 degrees) the components of magnetic flux induced by current flow in the inner electrodes 33 and 34 are cancelled out, thereby reducing the ESL.

However, in order to generate the current flows described above, the notches have to be provided in the inner electrodes 33 and 34 which reduces the capacitance of the capacitor unit.

This capacitor also creates mounting problems. Since the external terminal electrodes 36 and 38 are formed on one side of the capacitor body 31, the other side is easily lifted up when being mounting to the circuit board.

SUMMARY OF THE INVENTION

A monolithic capacitor according to a first embodiment of the present invention, includes:

a capacitor body in the form of a parallelepiped having two opposing principle surfaces and four side surfaces extending between the principle surfaces, the capacitor body including a plurality of dielectric layers extending in a direction generally parallel to the principle surfaces and at least one pair of opposed first and a second inner electrodes each in the shape of quadrilateral, the first and second inner electrodes facing one another via a respective one of the dielectric layers so as to form a capacitor unit; and first, second, third and fourth external corner terminal electrodes located at respective corners of the capacitor body where adjacent the side surfaces intersect;

first and second lead electrodes extending from respective corners of the first electrode to the first and second external corner terminal electrodes, respectively, so as to electrically connect the first internal electrode to the first and second external corner terminal electrodes; and third and fourth lead electrodes extending from respective corners of the second electrode to the third and fourth external corner terminal electrodes, respectively, so as to electrically connect the second internal electrode to the third and fourth external corner terminal electrodes.

In this embodiment, it is preferred that the monolithic capacitor further includes:

n external side surface terminal electrodes, each of the external side surface terminal electrodes being located at an associated one of the side surfaces of the capacitor body, n being an integer greater than or equal to one; and n additional lead electrodes, each of the additional lead electrodes extending from one of the first and second inner electrodes to a respective one of the external side surface terminal electrodes.

A yet further preferred feature of this embodiment is that the first and second corner external electrodes are located at adjacent the corners of the capacitor body and the third and fourth corner external electrodes are located at the remaining adjacent the corners of the capacitor body.

Another aspect of the first embodiment of the invention is that the monolithic capacitor further includes:

a first external side surface terminal electrode located at a first side surfaces of the capacitor body which side surface extends between the first and second corner electrodes;

a second external side surface terminal electrode located at a second side surface of the capacitor body which side surface extends between the third and fourth corner electrodes; and a first additional lead electrode extending from a side of the second inner electrode to the first external side surface terminal electrode so as to electrically connect the second inner electrode to the first additional lead electrode; and a second additional lead electrode extending from a side of the first inner electrode to the second external side surface terminal electrode so as to electrically connect the first inner electrode to the second additional lead electrode.

In the first embodiment the principle surfaces are preferably rectangles and the first and second side surfaces preferably extend along the length of the rectangles.

In a variation of this first embodiment the first and second external corner electrodes are located at diagonally opposed corners of the capacitor body.

In accordance with a second embodiment of the invention, the monolithic capacitor comprises:

a capacitor body in the form of a parallelepiped having two opposing principle surfaces and four side surfaces extending between the principle surfaces, the capacitor body including a plurality of dielectric layers extending in a direction generally parallel to the principle surfaces and at least one pair of opposed first and a second inner electrodes each in the shape of quadrilateral, the first and second inner electrodes facing one another via a respective one of the dielectric layers so as to form a capacitor unit; and first, second, third and fourth external corner terminal electrodes located at respective corners of the capacitor body where adjacent the side surfaces intersect;

n external side terminal electrodes, each of the external side terminal electrodes being located at an associated one of the side surfaces of the capacitor body, n being an integer greater than or equal to 1;

first, second, third and fourth lead electrodes that extending from corresponding corners of the first inner electrode to the first, second, third and fourth external corner terminal electrodes, respectively; and n additional lead electrodes, each of the lead electrodes extending from the second inner electrode to a respective one of the n external side terminal electrodes.

In this embodiment n is preferably four and each of the external side surface terminal electrodes is located at a different one of the side surfaces.

In a third embodiment of the invention, the monolithic capacitor, comprises:

a capacitor body in the form of a parallelepiped having two opposing principle surfaces and four side surfaces extending between the principle surfaces, the capacitor body including a plurality of dielectric layers extending in a direction generally parallel to the principle surfaces and at least a pair of opposed first and a second inner electrodes each in the shape of quadrilateral, the first and second inner electrodes facing one another via a respective one of the dielectric layers so as to form a capacitor unit; and first, second, third and fourth external corner terminal electrodes located at respective corners of the capacitor body where adjacent the side surfaces intersect;

n external side terminal electrodes, each of the external side terminal electrodes being located at an associated one of the side surfaces of the capacitor body, n being an integer greater than or equal to one;

first, second and third lead electrodes that extending from corresponding corners of the first inner electrode to the first, second and third external corner terminal electrodes, respectively; and n additional lead electrodes, each of the lead electrodes extending from the second inner electrode to a respective one of the n external side terminal electrodes.

Preferably, the monolithic capacitor according to this third embodiment further includes a further lead electrode which extends from the remaining corner of the second inner electrode to the fourth external corner electrode so as to electrically connect the second inner electrode to the fourth external corner electrode.

N external terminal electrodes are preferably located at the side surfaces of the capacitor body which extend between the first and second and the second and third external corner electrodes. N is preferably 2.

In each of the preferred embodiments, the corners of the capacitor body can be campfered.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

FIGS. 3A, 3B and 3C correspond to FIGS. 2A, 2B and 2C, respectively.

FIGS. 4A, 4B and 4C correspond to FIGS. 2A, 2B and 2C, respectively.

FIGS. 5A and 5B correspond to FIGS. 1A, 1B and 1C, respectively.

FIG. 6A is a plane view showing the internal structure of the monolithic capacitor 141 along a cross-section through which a first inner electrode 150 passes. FIG. 6B is a plane view showing an internal structure of the monolithic capacitor 141 along a cross-section through which a second inner electrode 151 passes.

FIGS. 7A and 7B correspond to FIGS. 6B and 6C, respectively.

FIGS. 8A and 8B correspond to FIGS. 6B and 6C, respectively.

FIG. 9A is a plane view showing the internal structure of the monolithic capacitor 1 taken along a cross-section through which the first inner electrode 8 passes. FIG. 9B is a plane view showing the internal structure of the monolithic capacitor 1 taken along a cross-section through which the second inner electrode 9 passes.

FIG. 10A is a plane view showing the internal structure of the monolithic capacitor 26 taken along a cross-section through which the first inner electrode 33 passes, and FIG. 10B is a plane view showing the internal structure of the monolithic capacitor 26 taken along a cross-section through which the second inner electrode 34 passes.

DESCRIPTION OF THE PREFERRED EMBODIMENTS

Figure 1A:
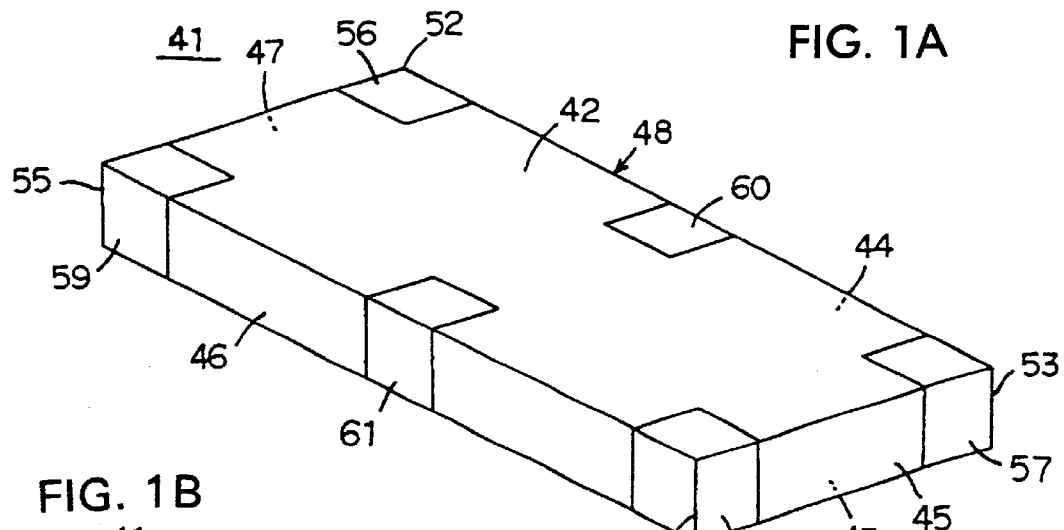
FIG. 1A is a perspective view showing a monolithic capacitor 41 constructed in accordance with a first embodiment of the present invention.

Referring now to the drawings wherein like numerals indicate like elements, there is shown in FIG. 1 shows a monolithic capacitor 41 constructed in accordance with a first embodiment of the present invention.

Monolithic capacitor 41 includes a parallelepiped capacitor body 48 having two rectangular (more generally quadrilateral) opposing principle surfaces 42 and 43 and four side surfaces 44, 45, 46 and 47 extending therebetween. Principle surfaces 42 and 43 are preferably planar and parallel to one another. Side surfaces 46 and 48 are preferably planar and parallel to one another as are side surfaces 45 and 47.

The capacitor body 48 includes a plurality of dielectric layers 49 located in respective planes which general extend parallel to the planes of the principle surfaces 42 and 43. Dielectric layers 49 are made, for example, of a ceramic dielectric material. At least one pair of first and second rectangular (more generally quadrilateral) inner electrodes 50 (FIG. 1B) and 51 (FIG. 1C), separated from each other by a respective dielectric layer 49, are provided to form a respective capacitor unit.

External terminal electrodes 56, 57, 58 and 59 are provided at respective corners 52, 53, 54 and 55 of capacitor body 48 where adjacent side surfaces intersect. External terminal electrodes 60 and 61 are formed at the side surfaces 44, 46 (preferably at the middle of the side surfaces), respectively.

Figure 1B:
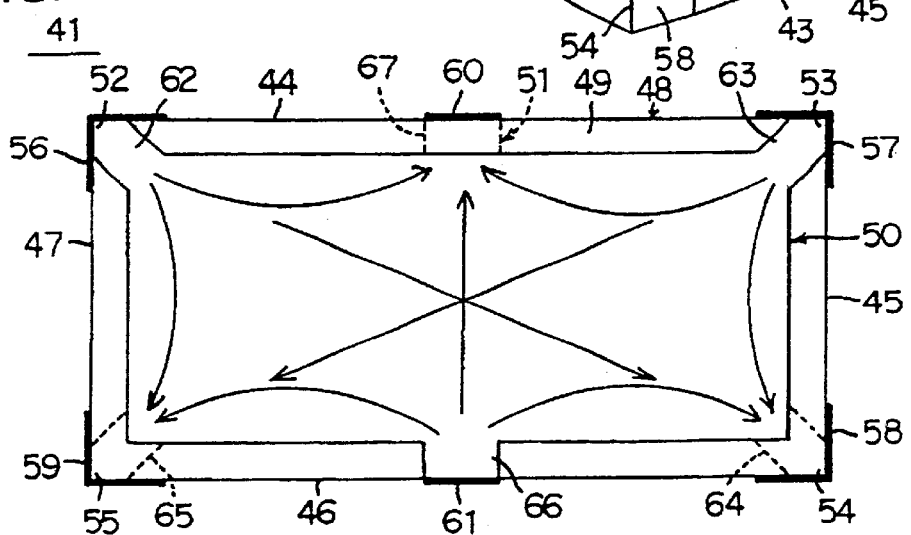
FIG. 1B is a plane view showing an internal structure of the monolithic capacitor 41 taken along a cross-section through which a first inner electrode 50 passes, and FIG. 1C that is a plane view showing an internal structure of the monolithic capacitor 41 taken through which a second inner electrode 51 passes.

As shown in FIG. 1B, two lead electrodes 62 and 63 extend from respective corners of first inner electrode 50 to the corresponding corners 52 and 53 of capacitor body 48, so as to electrically connect the first inner electrode 50 to the external terminal electrodes 56 and 57, respectively.

Figure 1C:
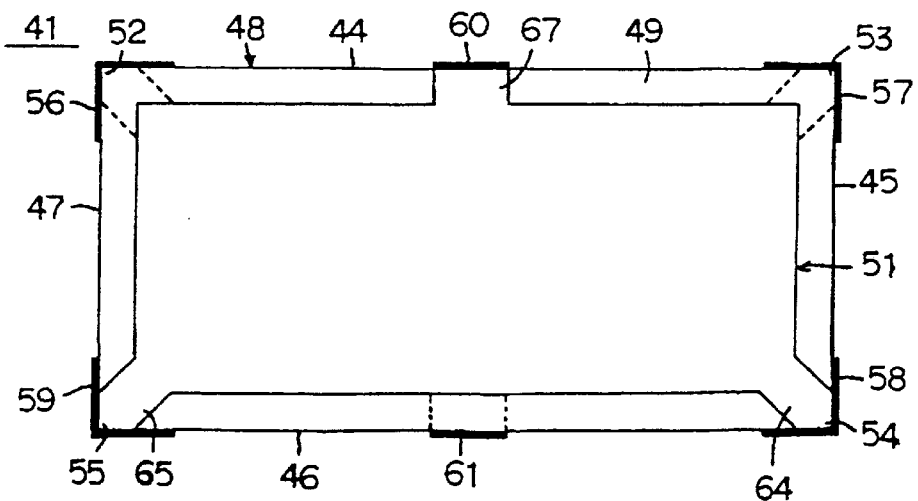

As shown in FIG. 1C, two lead electrodes 64 and 65 extend from respective corners of the second inner electrode 51 to the corresponding corners 54 and 55 of capacitor body 48, to electrically connect the second internal electrode 51 to the external terminal electrodes 58 and 59, respectively.

A further lead electrode 66 extends from first inner electrode 50 to the external terminal electrode 61 provided on the side surface 46 that extends between the corners 54 and 55 of the capacitor body 48 where the external terminal electrodes 58 and 59 are electrically connected to the second inner electrode 51.

Similarly, a further lead electrode 67 extends from the second inner electrode 51 to the external terminal electrode 60 located on the side surface 44 at a location between the corners 52 and 53 of the capacitor body 48 where the external terminal electrodes 56 and 57 are electrically connected to the first inner electrode As described above, the external terminal electrodes 56, 57 and 61 are connected to the first inner electrode 50, and the external terminal electrodes 58, 59 and 60 are electrically connected to the first inner electrode 50. The three external terminal electrodes 56, 57 and 61 connect to the first inner electrode 50 are lined up alternatively relative to the three external terminal electrodes 58, 59 and 60 which are connected to the second inner electrode 51 as one moves around the periphery of the capacitor body 48.

In order to obtain a larger capacitance, it is preferred that a plurality of capacitor units (each including a respective pair of first and second inner electrodes separated by a respective dielectric layer) be provided. Except for the uppermost and lowermost internal electrodes, it is preferably that each of the first and second inner electrodes 50 and 51 be sandwiched by a pair of the other of the first or second inner electrodes 50 and 51 when attempting to obtain a larger capacitance by providing a plurality of groups of first and second inner electrodes 50 and 51. The plurality of resulting capacitor units are then connected in parallel via the external terminal electrodes 56–61.

The foregoing features of the invention described above with respect to the first embodiment are equally applicable to other embodiments described below.

The external terminal electrodes 56–61 are preferably formed both on the appropriate side surfaces 44–47 and on the main surfaces 42 and 43 (see, e.g., FIG. 1A).

Figure 9A:
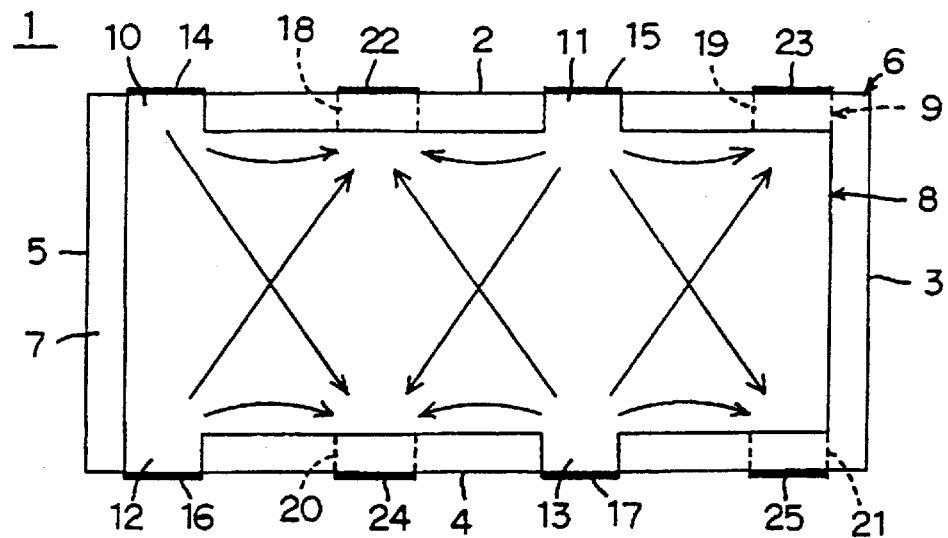
FIGS. 9A and 9B show a conventional capacitor 1.
Figure 9B:
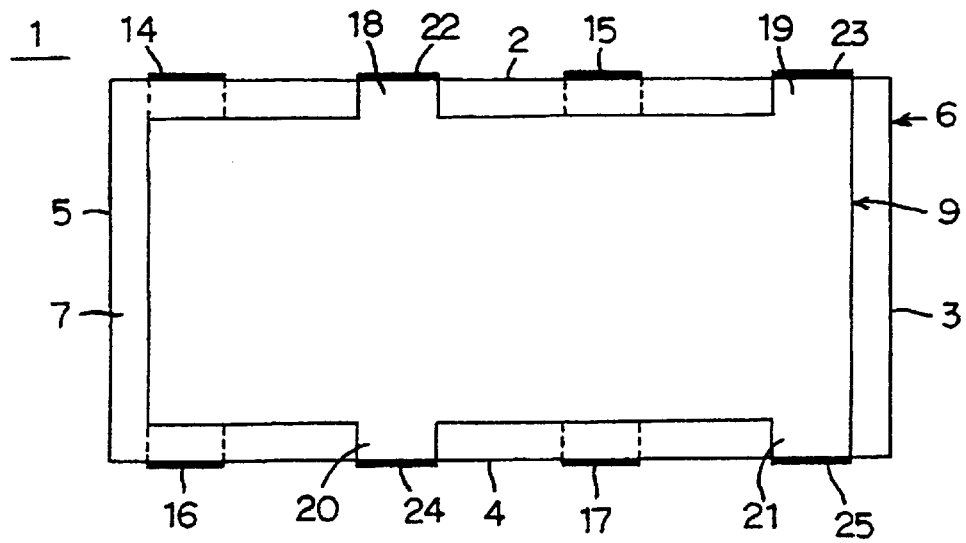

In FIG. 1B, typical paths and directions of currents that flow in monolithic capacitor 41 at a given point in time are illustratively shown with arrows. In FIG. 1B, the currents flow from the external terminal electrodes 56, 57 and 61 which are connected to the first inner electrode 50, toward the external terminal electrodes 58, 59, 60 which are connected to the second inner electrode 51. Since the currents flow in multiple different directions with a spread of an approximately 180 degrees at the centers of the inner electrodes 50 and 51, as well as the respective neighborhoods of central lead electrodes 66 and 67, the components of magnetic flux are effectively cancelled out, thereby contributing to reduce the ESL. This is substantially equal to the case of the monolithic capacitor 1 shown in FIG. 9 and described above.

However, in the monolithic capacitor 41 according to this first embodiment, since the lead electrodes 62 and 63 are formed at the corners of the first inner electrode 50, and the lead electrodes 64 and 65 are formed at the corners of the second inner electrode 51, a smooth flow of the current is also achieved in these areas and, as a result, the canceling effect of the magnetic flux is enhanced, thereby demonstrating an outstanding effect of reducing the ESL.

This embodiment is particularly advantageous because the distance between each respective pair of adjacent pair of outer electrodes (i.e., this distance between pairs 52, 60, between pairs 60, 53, between pairs between 53, 54, between pairs 54, 61 and between pairs 61, 55) are spaced the same. This ensures that each component of current flow in the inner electrodes is relatively short which further reduces ESL.

A sample of the monolithic capacitor 41 according to the first embodiment, was produced, and its ESL was evaluated. In the sample, a total of 6 layers of inner electrodes, each having external dimensions of 3.2 mm by 1.6 mm was prepared. The ESL was determined using the resonance method. The resonance method is a method that measures a frequency characteristic of an impedance for the monolithic capacitor that is to be the sample, and determining the ESL by solving the following equation:

$$ESL = 1/[(2\pi f_0)^2 \times Cs]$$

with $f_0$ being the frequency of a local minimum point (called a series resonance point) and Cs is the capacitance component of the capacitor.

The measured ESL of the monolithic capacitor 41 according to the first embodiment was 85.2 pH. In comparison, the ESL of the monolithic capacitor 1 of FIG. 9, having a similar design, was 98.9 pH.

From these results, it can be seen that providing lead electrodes extending from the corners of the inner electrodes and providing external terminal electrodes on the corners of the capacitor body results in a significant reduction in ESL.

Figure 2A:
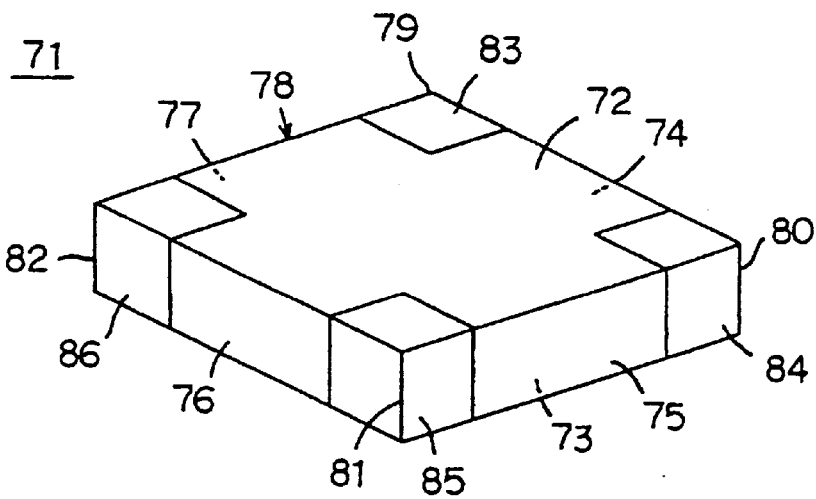
FIG. 2A is a perspective view showing a monolithic capacitor 71 in accordance with a second embodiment of the present invention.
Figure 2B:
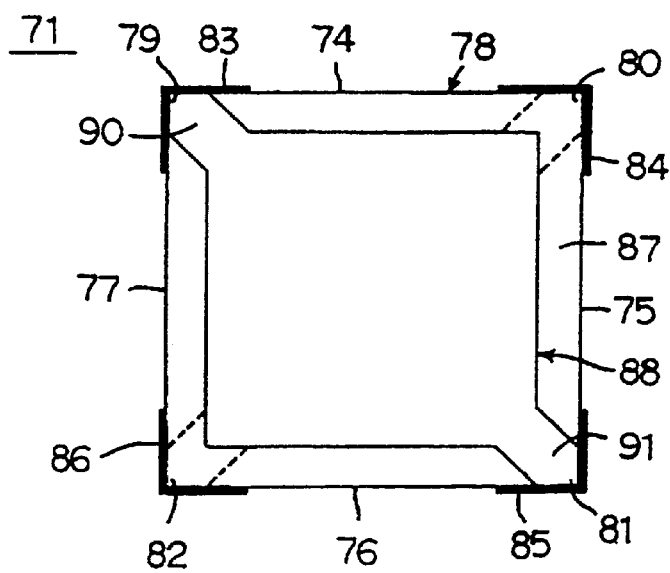
FIG. 2B is a plane view showing an internal structure of the monolithic capacitor 71 taken along a cross-section through which a first inner electrode 88 passes.
Figure 2C:
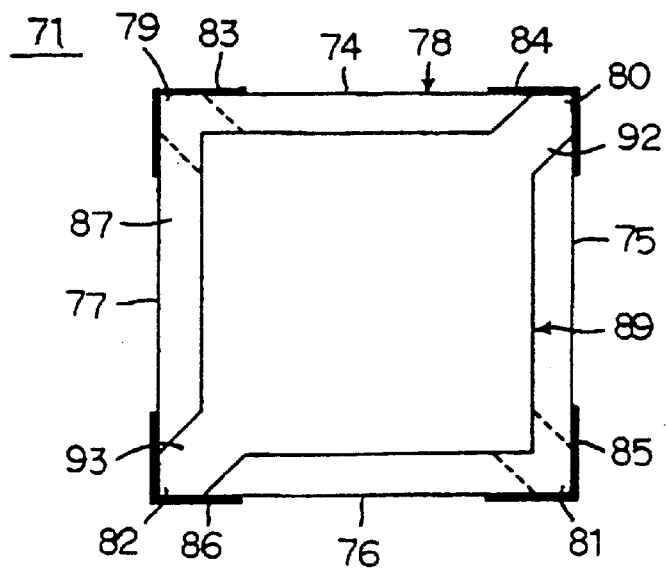
FIG. 2C is a plane view showing an internal structure of the monolithic capacitor 71 taken along a cross-section through which a second inner electrode 89 passes.

FIGS. 2A–2C show a monolithic capacitor 71 according to a variation of the first embodiment of the present invention. In this embodiment, monolithic capacitor 71 includes a capacitor body 78 having two square (more generally, quadrilateral) principle surfaces 72 and 73 facing each other, and four side surfaces 74, 75, 76 and 77 extending between the main surfaces 72 and 73. External terminal electrodes 83, 84, 85 and 86 are provided at respective corners 79, 80, 81 and 82 of the capacitor body 78. The external terminal electrodes cover adjacent side surfaces and at least part of the top surface of the capacitor body 78.

The capacitor body 78 includes a plurality of dielectric layers 87 extending parallel to the principle surfaces 72 and 73, and at least one pair of a first and a second inner electrodes 88 and 89, facing each other and separated by a respective dielectric layer 87, so as to form a respective capacitor unit. Each inner electrode takes the form of a quadrilateral, more particularly a square.

Two lead electrodes 90 and 91 extend from the corners of first inner electrode 88 to electrically connect the first inner electrode to respective diagonally opposed external terminal electrodes 83 and 85. Similarly, two lead electrodes 92 and 93 extend from the corners of second inner electrode 89 to respective diagonally opposed external terminal electrodes 84 and 86.

In this embodiment, since the lead electrodes 90–93 are formed to extend from respective corners of the inner electrodes to respective corners 79–82 of the capacitor body, the flow of a current becomes smooth in the corner parts of the inner electrodes 88 and 89, thereby reducing the ESL.

A sample of the monolithic capacitor 71 according to the second embodiment, was produced, and its ESL evaluated using the same method as for the monolithic capacitor 41 according to the first embodiment as described above. The sample had a total of 6 layers of inner electrodes, each of whose outer dimensions were 2 mm×2 mm. The ESL was 193 pH.

Figure 3A:
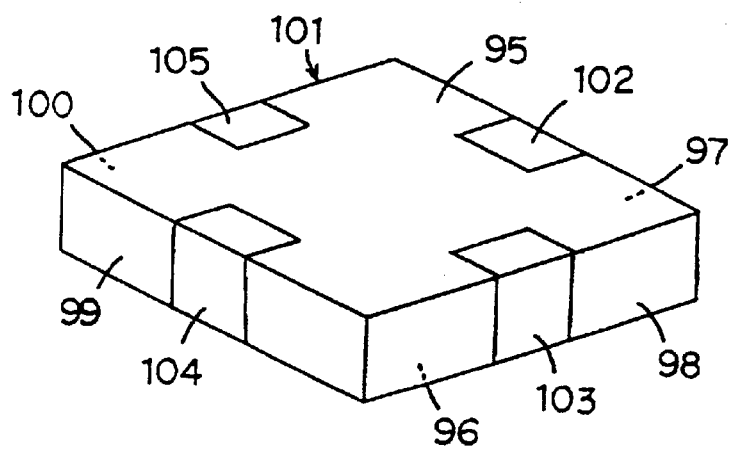
FIGS. 3A–3C show a monolithic capacitor 94 used to evaluate the characteristics of the monolithic capacitor 71 shown in FIGS. 2A, 2B and 2C.
Figure 3B:
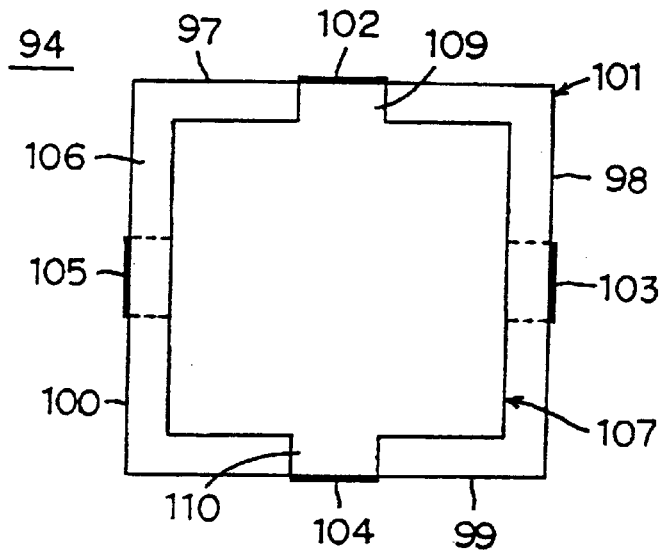
Figure 3C:
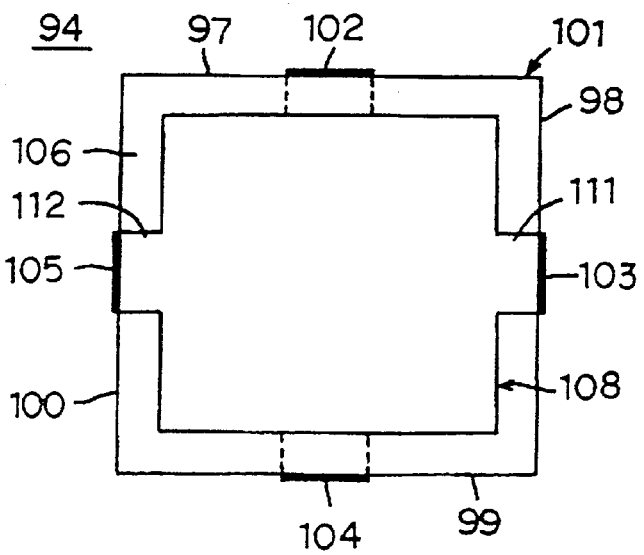

In order to determine the comparative effect of this structure, a sample of a monolithic capacitor 94 constructed in accordance with FIGS. 3A–3C was produced. The monolithic capacitor 94 includes a capacitor body 101 having an appearance similar to the capacitor body 78 shown in FIG. 2 with two principle surfaces 95 and 96 facing each other, and four side surfaces 97–100 extending therebetween. The external terminal electrodes 102–105 were respectively provided on the side surfaces 97–100 of the capacitor body 101. The capacitor body 101 included a plurality of dielectric layers 106, and at least one pair of first and second inner electrodes 107 and 108, facing each other through a respective dielectric layer 106.

A pair of lead electrodes 109 and 110 extend from the first inner electrode 107 to respective side surfaces 97 and 99 of capacitor body 101. They are electrically connected to the external terminal electrodes 102 and 104, respectively, near the center of the respective side surfaces. Two lead electrodes 111 and 112 extend from the second inner electrode 108 to the side surfaces 98 and 100, respectively, and are electrically connected to the external terminal electrodes 103 and 105, respectively.

In this sample, 6 layers of the inner electrodes 107 and 108 were provided, each having outer dimensions of 2 mm×2 mm. The ESL was measured using the foregoing method as 247 pH.

Here, as can be seen by comparing the ESL of 193 pH obtained by the sample according to the monolithic capacitor 71 shown in FIG. 2 with the ESL of 247 pH obtained by the sample according to the monolithic capacitor 94 shown in FIG. 3, even though the number of the external terminal electrodes are the same, the provision of lead electrodes extending to the corners of the capacitor body effectively reduced the ESL.

Figure 4A:
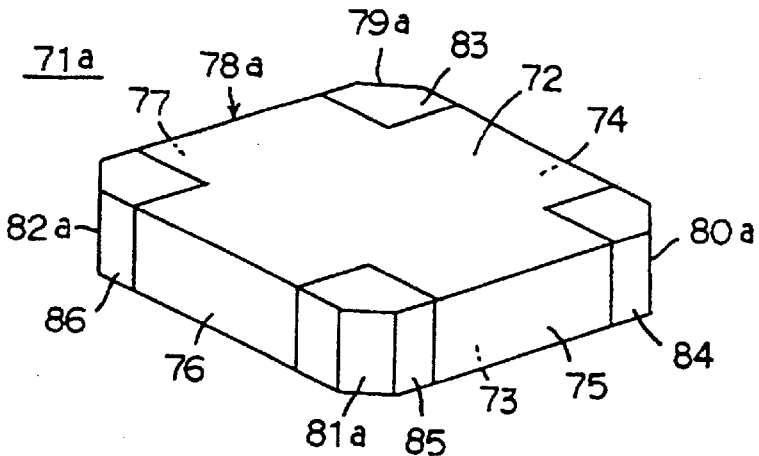
FIGS. 4A, 4B and 4C illustrate a monolithic capacitor 71a according to the third embodiment of the present invention.
Figure 4B:
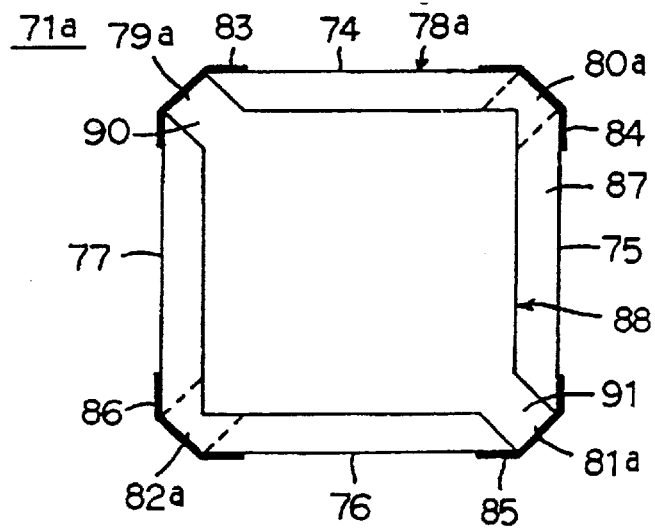
Figure 4C:
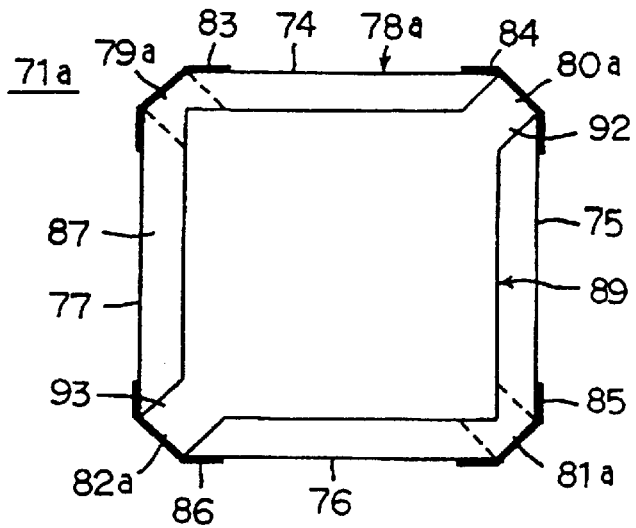

FIGS. 4A–4C show a monolithic capacitor 71a according to a variation of the embodiment of FIGS. 2A–2C. Monolithic capacitor 71a has a capacitor body 78a whose shape is chamfered at the edge parts 79a, 80a, 81a and 82a. The structure of the embodiment if FIGS. 4A–4C is otherwise substantially the same as the monolithic capacitor 71 shown of FIGS. 2A–2C. The same reference symbols are used to identify equivalent elements and those elements will not be described again.

Figure 5A:
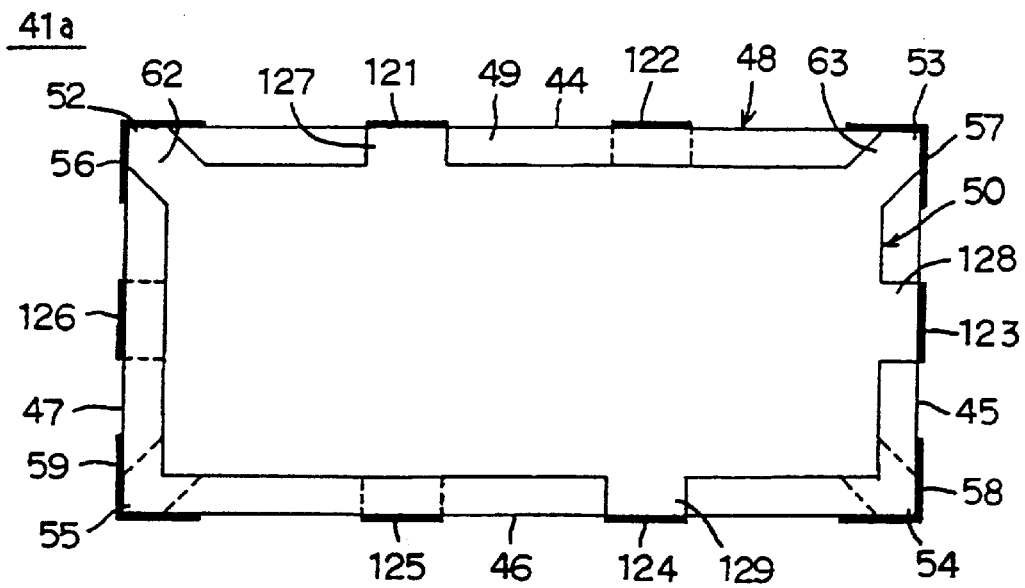
FIGS. 5A and 5B and illustrate a monolithic capacitor 41a according to the fourth embodiment of the present invention.
Figure 5B:
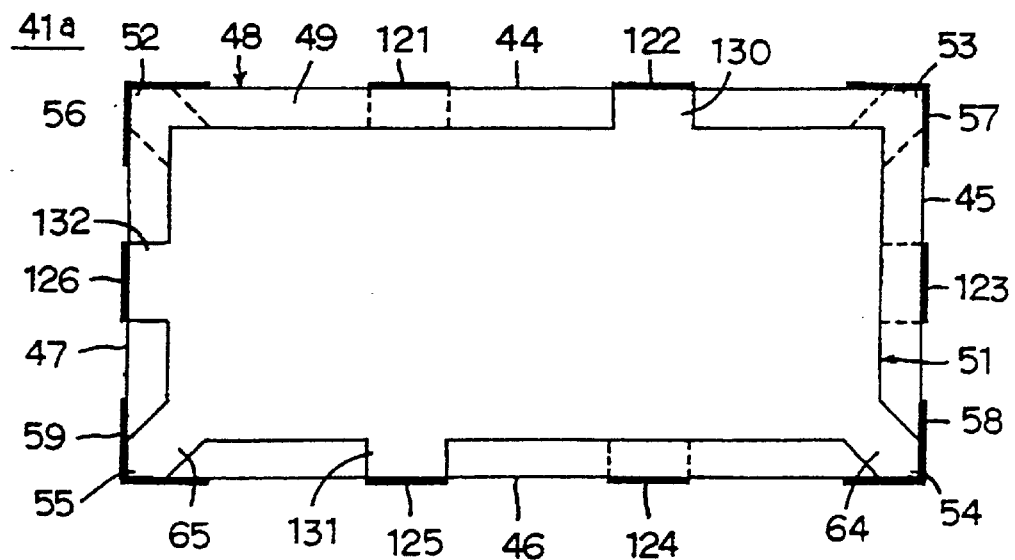

FIGS. 5A–5B show a monolithic capacitor 41a according to a third variation of the first embodiment of the present invention. This monolithic capacitor 41a is a variation of the monolithic capacitor 41 shown in FIGS. 1A–1C.

The primary difference between monolithic capacitor 41a of FIGS. 5A–5B and monolithic capacitor 41 of FIGS. 1A–1C is that the number of external electrodes formed on the side surfaces 44, 46 are increased, and accordingly the number of lead electrodes is also increased. The structure of monolithic capacitor 41a is otherwise substantially the same as that of monolithic capacitor. The same reference symbols are used to identify the equivalent elements and an explanation of these elements will be omitted.

Referring to FIGS. 5A and 5B, two external terminal electrodes 121 and 122 are provided on the side surface 44, one external terminal electrode 123 is provided on the side surface 45, two external terminal electrodes 124 and 125 are provided on the side surface 46, and one external terminal electrode 126 is provided on the side surface 47. In addition to the lead electrodes 62 and 63 which electrically connect the first internal electrode 50 to the external terminal electrodes 56 and 57 at the respective corners of capacitor body 48, lead electrodes 127, 128 and 129 extend from the first inner electrode 50 and are electrically connected to the external terminal electrodes 121, 123 and 124, respectively.

In addition to the lead electrodes 64 and 65 which electrically connect the second internal electrode 51 to the external terminal electrodes 58 and 59 at the respective corners of the capacitor body 148, three lead electrodes 130, 131 and 132 extend from the second inner electrode 51 and are electrically connected to the external terminal electrodes 122, 125 and 126, respectively.

By increasing the number of the external terminal electrodes 121–126 at the side surfaces as well as by increasing the number of the lead electrodes 127–131 connected thereto, it is possible to further reduce the ESL.

Figure 6A:
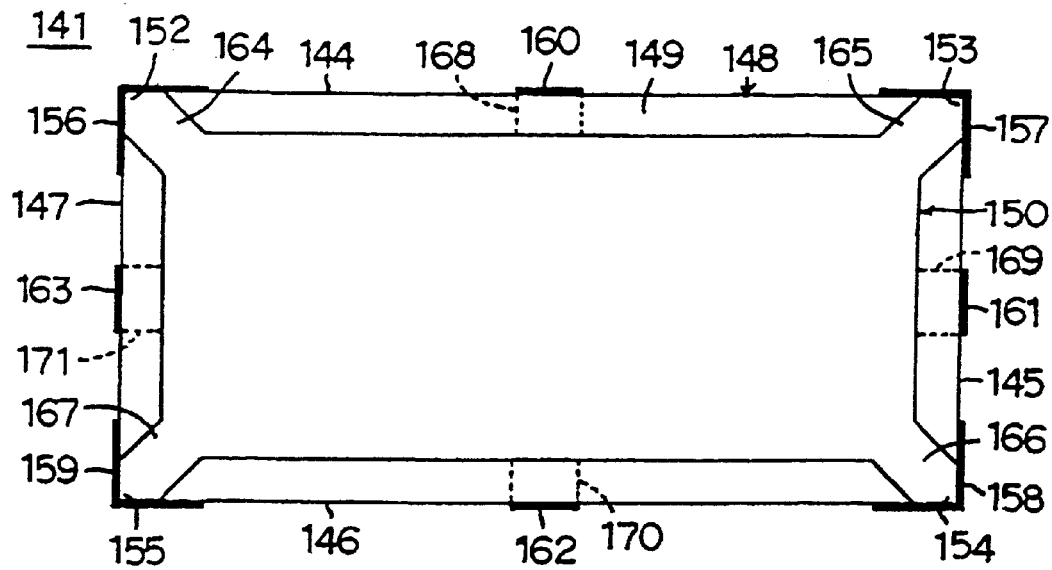
FIGS. 6A and 6B show a monolithic capacitor 141 according to the fifth embodiment of the present invention.
Figure 6B:
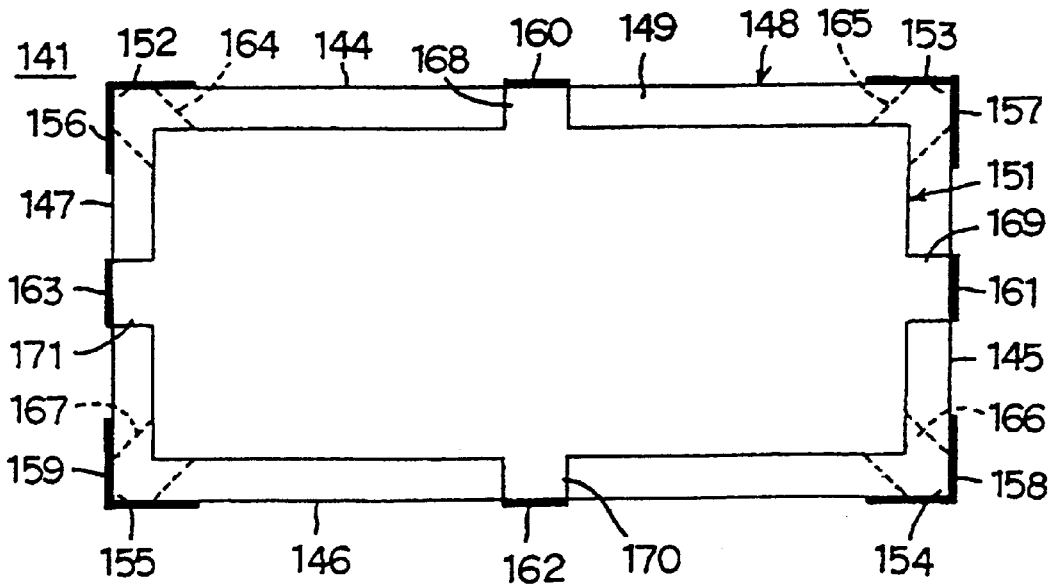

FIGS. 6A and 6B show a monolithic capacitor 41 according to a second embodiment of the present invention. Monolithic capacitor 141 includes a capacitor body 148 having two rectangular (more generally quadrilateral) principle surfaces which face each other, and four side surfaces 144, 145, 146 and 147 coupled therebetween. The capacitor body 148 includes a plurality of dielectric layers 149, for example, made of a ceramic dielectric, lying generally parallel to the main surfaces. At least one pair of a first and second inner electrodes 150 and 151 face each other through a respective dielectric layer 149 so as to form a respective capacitor unit. Each capacitor unit is substantially quadrilateral in shape.

External terminal electrodes 156, 157, 158 and 159 are provided at the respective four corners of the capacitor body 148. External terminal electrodes 160, 161, 162 and 163 are provided on respective side surfaces 144, 145, 146 and 147 (preferably in the middle of those surfaces), intermediate of respective pairs of the external terminal electrodes 156, 157, 158 and 159.

Four lead electrodes 164, 165, 166 and 167 extend from respective corners of the first inner electrode 150 to the corresponding corners 152–155 of the capacitor body 148 so as to electrically connect the first inner electrode 150 to the external terminal electrodes 156–159, respectively. Four lead electrodes 168, 169, 170 and 171 extend from respective sides of the second inner electrode 151 to the external terminal electrodes 160–163 located at the four side surfaces, respectively, so as to electrically connect the second internal electrode 151 to external terminal electrodes 160–163. The external terminal electrodes 156–159 connected to the first inner electrode 150 are lined up alternatively with the external terminal electrode 160–163 connected to the second inner electrode 151 as viewed along the periphery of capacitor body 148.

In this embodiment, since the lead electrodes 164–167 are formed to extend from the corresponding corners of the inner electrode 150 to the corresponding corners 152–155 of the capacitor body 148, the flow of current at the corners of the inner electrodes 150 and 151 is smooth, thereby reducing the ESL. Additionally, because the external terminal electrodes connected to the first inner electrode are placed alternatively with respect to the external terminal electrodes connected to the second inner electrode, the cancellation of the components of magnetic flux are more effective, thereby further reducing the ESL.

Various modifications to this embodiment are possible. For example, additional lead electrodes (and with them additional external electrodes) may be provided. Additional lead electrodes can be provided for the first inner electrode 150, the second inner electrode 151 or both. In any event, it is preferable that the arrangement of the external terminal electrodes connected to the first inner electrode 150 and the external terminal electrodes connected to the second inner electrode line up alternately on the four side surfaces 144–147.

Figure 7A:
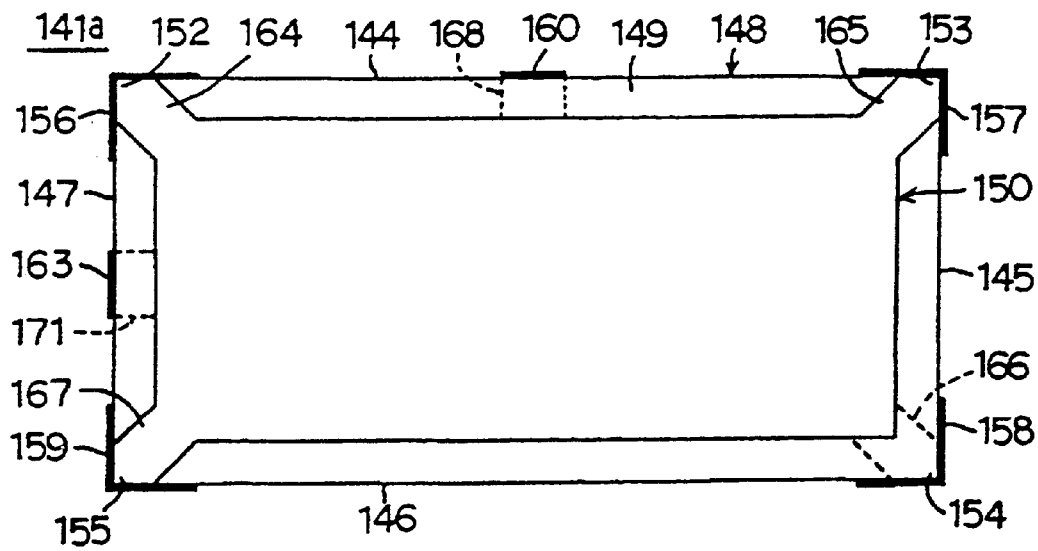
FIGS. 7A and 7B show a monolithic capacitor 141a according to the sixth embodiment of the present invention.
Figure 7B:
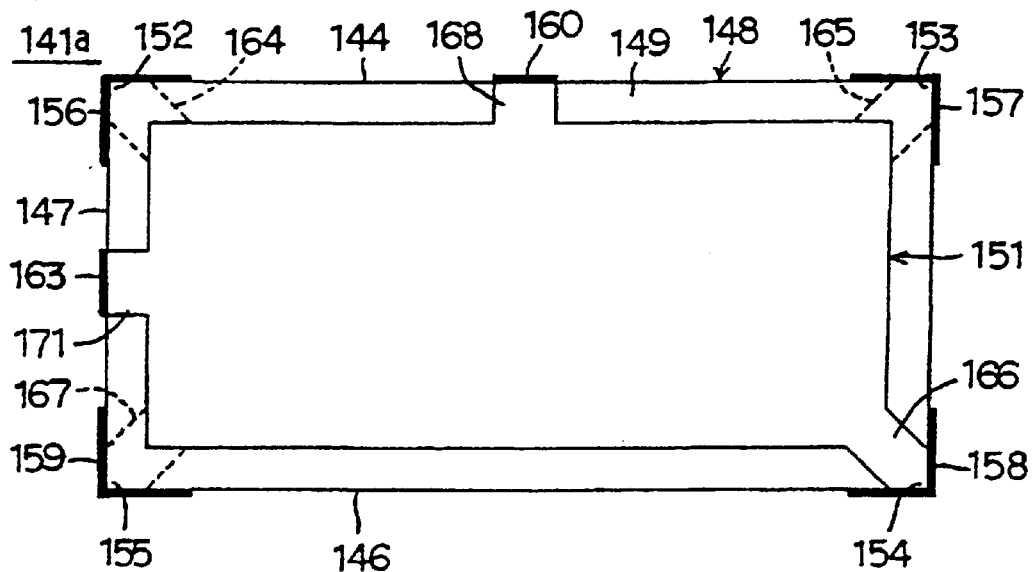

FIGS. 7A and 7B show a monolithic capacitor 41a according to a third embodiment of the present invention. This monolithic capacitor 141a is a variation of the monolithic capacitor 141 shown in FIGS. 6A and 6B. Corresponding elements are labeled with the same reference numerals and will not be described again.

Describing the characteristic of the monolithic capacitor 141a, in comparison with the monolithic capacitor 141 shown in FIGS. 6A and 6B, there are no external electrodes 161 and 162 provided at the side surfaces of the monolithic capacitor 141, and there are no lead electrodes 169 and 170 connected to these external terminal electrodes 161 and 162, and further the lead electrode 166 extends from the second inner electrode 151 to external terminal electrode 158.

The external terminal electrodes 160 and 163 are provided, respectively, on side surfaces 144 and 147 of the capacitor body 148. As shown in FIG. 7A, the first inner electrode 150 includes three lead electrodes 164, 165 and 167 which are electrically connected to the external terminal electrodes 156, 157 and 159 (located at respective corners of the capacitor body 148), respectively. As shown in FIG. 7B, two lead electrodes 168 and 171 extend from the sides of the second inner electrode 151 to external electrodes 160, 163, respectively, and a third lead electrode 166 extends from a corner of the second inner electrode 151 to external terminal electrode 158 located at the corner 154 of capacitor body 148.

The external terminal electrodes 156, 157 and 159 connected to the first inner electrode 150, and the external terminal electrodes 160, 158 and 163 connected to the second inner electrode 151 are located along the periphery of capacitor body 148 in alternating fashion.

With this embodiment, since the lead electrodes 164–167 extend from the corresponding corners of the inner electrode 150 or 151 to the corresponding corner 152–155 of the capacitor body 148, the flow of current becomes smooth at the corners of the inner electrodes 150 and 151, thereby contributing to reduce the ESL.

Figure 8A:
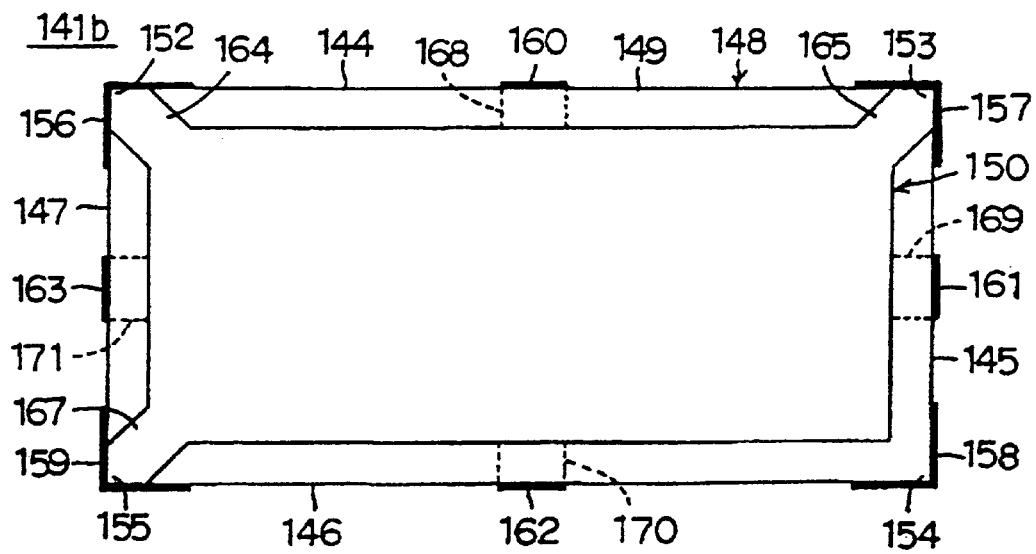
FIGS. 8A and 8B show a monolithic capacitor 141b according to the seventh embodiment of the present invention.
Figure 8B:
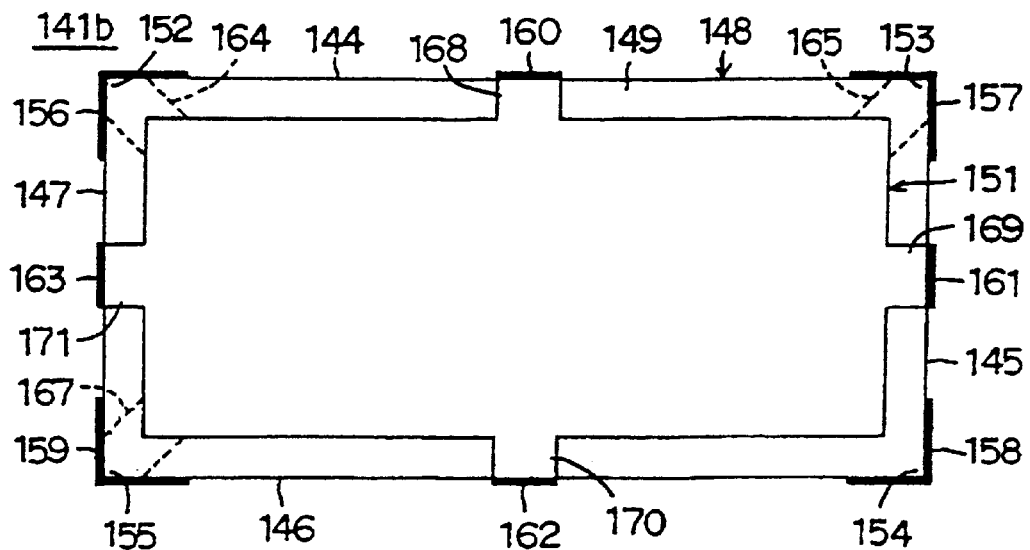

FIGS. 8A and 8B show a monolithic capacitor 141*b* according to a variation of the third embodiment of FIGS. 7A and 7B. Again, the corresponding elements of this embodiment are indicated with the same numerals as the prior embodiments and will not be redescribed. Comparing monolithic capacitor 141*b* to monolithic capacitor 141 of FIGS. 6A and 6B, there is no lead electrode 166 electrically connected to the external terminal electrode 158 as in the monolithic capacitor 141.

Particularly, the first inner electrode 150 has three lead electrodes 164, 165 and 167 which are electrically connected to the external terminal electrodes 156, 157 and 159, respectively. The second inner electrode 151 includes four lead electrodes 168–171 which are electrically connected to the external terminal electrodes 160–163, respectively.

In this embodiment, since three lead electrodes 164, 165 and 167 extend from the corresponding corners of the inner electrode 150 to the corresponding corner 152, 153 and 155, respectively, of the capacitor body 148, the flow of current is smooth at these three corners of the inner electrode 150, thereby reducing the ESL.

Further, in the monolithic capacitor 141*b* of FIGS. 8A and 8B, although the external terminal electrode 158 is not coupled to either inner electrode 150 or inner electrode 151, by providing four external terminal electrodes 156–159 and having them cover at least part of the principle surface of the capacitor body, it is possible to avoid the problem which would occur in mounting the capacitor 141*b* when one side of the capacitor body is easily lifted at a time of mounting to the circuit board.

Although the present invention has been described with reference to the specific embodiments shown in drawings, various alternative arrangements of the lead electrodes and the external electrodes which will fall within the scope of the present invention.

As a result of the foregoing features of the first embodiment of the present invention, the resonance frequency of the monolithic capacity can be increased, it can be advantageously used as a device capacitor or a decoupling capacitor in a high-frequency circuit.

Further, the present invention can satisfactorily be used as a decoupling capacitor for a MPU (Micro Processing Unit) wherein it functions as a quick power supplier (supplying electric power from the amount of electricity charged on the capacitor to the MPU at, for example, start up). Since the invention reduces the ESL, it can be satisfactorily used at high speeds.

For example, recently developed (or soon to be developed) MPUs operate at frequencies between 500 MHz and 1 GHz. A capacitor to be used with the high speed operation of these MPUs should have an inductance component of less than or equal to 10 pH. By providing a monolithic capacitor according to the present invention which effectively reduces the ESL, and the number of capacitors which must be connected in parallel to achieve this result can be reduced.

Figure 10A:
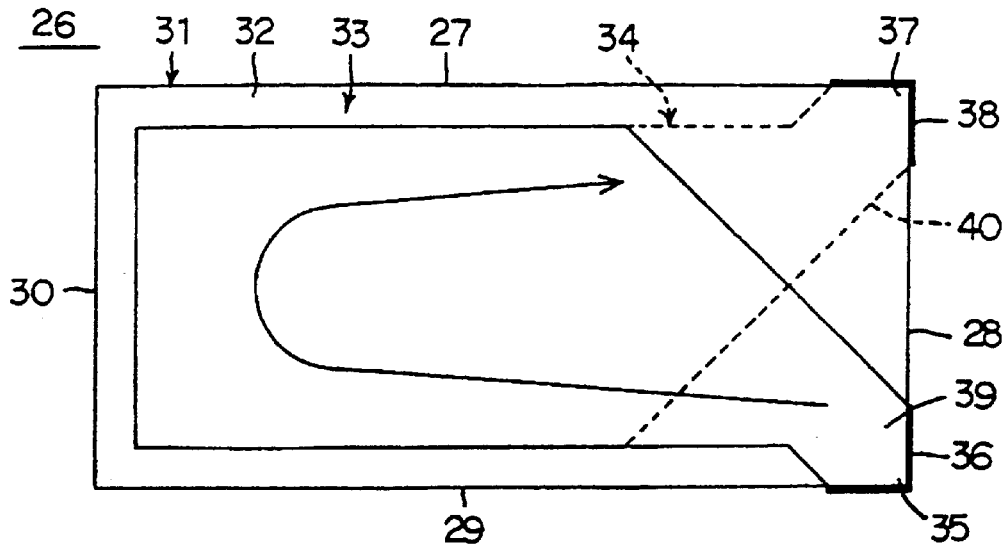
FIGS. 10A and 10B show another conventional capacitor 26.
Figure 10B:
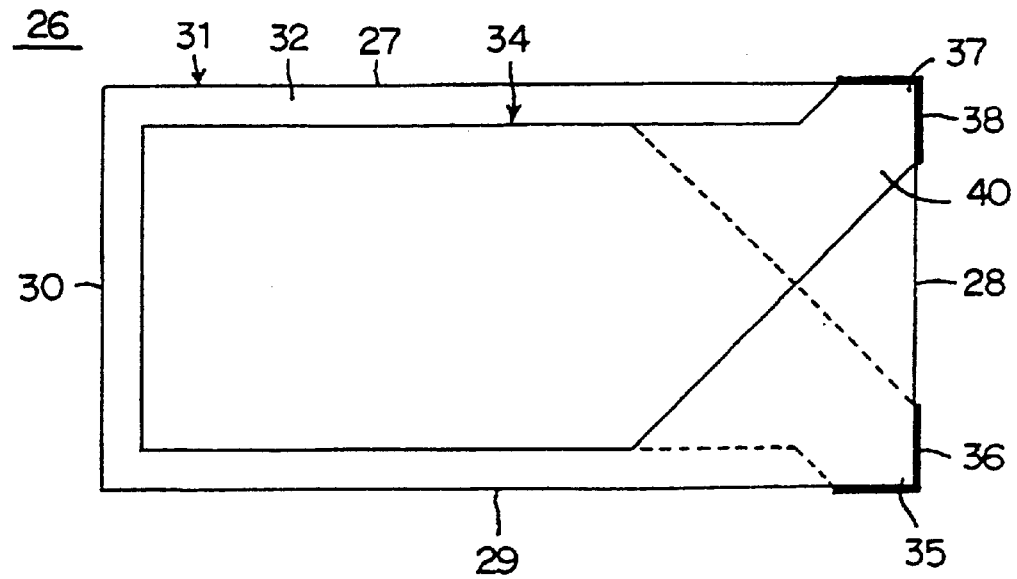

Also, according to the present invention, the shape of the inner electrode can be maintained substantially in the form of a quadrilateral. It is not necessary to form the inner electrodes, such as 33 and 34 in FIG. 10, with a notch which sacrifice capacitance obtained.

Further, according to the present invention, at least the external terminal electrodes are provided on four corners of the capacitor body thereby avoiding mounting problems which could occur when one side of the capacitor body is easily lifted at a time of mounting to a circuit board.

In the present invention, by further including the external terminal electrodes at the side surfaces of the capacitor body, and by arranging that at least one of the first and second inner electrodes is to be electrically connected to such external terminal electrodes, the ESL can be reduced.

Also, by utilizing the structure of FIGS. 1A and 1B, a cancellation of the magnetic fluxes is effectively generated, thereby demonstrating an outstanding effect on reducing the ESL.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A monolithic capacitor, comprising:

a capacitor body in the form of a parallelepiped having two opposing principle surfaces and four side surfaces extending between said principle surfaces, said capacitor body including a plurality of dielectric layers extending in a direction generally parallel to said principle surfaces and at least one pair of opposed first and second inner electrodes each in the shape of quadrilateral, said first and second inner electrodes facing one another via a respective one of said dielectric layers so as to form a capacitor unit;

first, second, third and fourth external corner terminal electrodes located at respective corners of said capacitor body where adjacent said side surfaces intersect;

first and second lead electrodes extending from respective corners of said first inner electrode to said first and second external corner terminal electrodes, respectively, so as to electrically connect said first inner electrode to said first and second external corner terminal electrodes; and third and fourth lead electrodes extending from respective corners of said second inner electrode to said third and fourth external corner terminal electrodes, respectively, so as to electrically connect said second inner electrode to said third and fourth external corner terminal electrodes.

2. A monolithic capacitor according to claim 1, wherein each of said external corner terminal electrodes straddle a respective said corner of said capacitor body such that it extends between adjacent side surfaces of said capacitor body.

3. A monolithic capacitor, comprising:

a capacitor body in the form of a parallelepied having two opposing principle surfaces and four side surfaces extending between said principle surfaces, said capacitor body including a plurality of dielectric layers extending in a direction generally parallel to said principle surfaces and at least one pair of opposed first and second inner electrodes each in the shape of a quadrilateral, said first and second inner electrodes each in the shape of a quadrilateral, said first and second inner electrodes facing one another via a respective one of said dielectric layers so as to form a capacitor unit;

first, second, third and fourth external corner terminal electrodes located at respective corners of said capacitor body where adjacent said side surfaces intersect;

first and second lead electrodes extending from respective corners of said first inner electrode to said first and second external corner terminal electrodes, respectively, so as to electrically connect said first inner electrode to said first and second external corner terminal electrodes;

third and fourth lead electrodes extending from respective corners of said second inner electrode to said third and fourth external corner terminal electrodes, respectively, so as to electrically connect said second inner electrode to said third and fourth external corner terminal electrodes;

n external side surface terminal electrodes, each of said external side surface terminal electrodes being located at an associated one of said side surfaces of said capacitor body, n being an integer greater than or equal to one; and n additional lead electrodes, each of said additional lead electrodes extending from one of said first and second inner electrodes to a respective one of said external side surface terminal electrodes.

4. A monolitic capacitor according to claim 3, wherein said first and second external corner terminal electrodes are located at diagonally opposed corners of said capacitor body.

5. A monlithic capacitor according to claim 4, wherein said corners of said body are campfered.

6. A monolithic capacitor, comprising:

a capacitor body in the form of a parallelepiped having two opposing principle surfaces and four side surfaces extending between said principle surfaces, said capacitor body including a plurality of dielectric layers extending in a direction generally parallel to said principle surfaces and at least one pair of opposed first and second inner electrodes each in the shape of a quadrilateral, said first and second inner electrodes each in the shape of a quadrilateral, said first and second inner electrodes facing one another via a respective one of said dielectric layers so as to form a capacitor unit;

first, second, third and fourth external corner terminal electrodes located at respective corners of said capacitor body where adjacent said side surfaces intersect;

first and second lead electrodes extending from respective corners of said first inner electrode to said first and second external corner terminal electrodes, respectively, so as to electrically connect said first inner electrode to said first and second external corner terminal electrodes;

third and fourth lead electrodes extending from respective corners of said second inner electrode to said third and fourth external corner terminal electrodes, respectively, so as to electrically connect said second inner electrode to said third and fourth external corner terminal electrodes;

said first and second external corner terminal electrodes being located at adjacent said corners of said capacitor body and said third and fourth external corner terminal electrodes being located at the remaining adjacent said corners of said capacitor body.

7. A monolithic capacitor according to claim 3, further including:

a first external side surface terminal electrode located at a first side surfaces of said capacitor body which side surface extends between said first and second external corner terminal electrodes;

a second external side surface terminal electrode located at a second side surface of said capacitor body which side surface extends between said third and fourth external corner terminal electrodes; and a first additional lead electrode extending from a side of said second inner electrode to said first external side surface terminal electrode so as to electrically connect said second inner electrode to said first additional lead electrode; and a second additional lead electrode extending from a side of said first inner electrode to said second external side surface terminal electrode so as to electrically connect said first inner electrode to said second additional lead electrode.

8. A monolithic capacitor according to claim 7, wherein said principle surfaces are rectangles and said first and second side surfaces extend along the length of said rectangles.

9. A monolithic capacitor, comprising:

a capacitor body in the form of a parallelepiped having two opposing principle surfaces and four side surfaces extending between said principle surfaces, said capacitor body including a plurality of dielectric layers extending in a direction generally parallel to said principle surfaces and at least one pair of opposed first and a second inner electrodes each in the shape of quadrilateral, said first and second inner electrodes facing one another via a respective one of said dielectric layers so as to form a capacitor unit; and first, second, third and fourth external corner terminal electrodes located at respective corners of said capacitor body where adjacent said side surfaces intersect;

n external side surface terminal electrodes, each of said external side surface terminal electrodes being located at an associated one of said side surfaces of said capacitor body, n being an integer greater than or equal to 1;

first, second, third and fourth lead electrodes extending from corresponding corners of said first inner electrode to said first, second, third and fourth external corner terminal electrodes, respectively; and n additional lead electrodes, each of said additional lead electrodes extending from said second inner electrode to a respective one of said n external side surface terminal electrodes.

10. A monolithic capacitor according to claim 9, wherein n is four and each of said external side surface terminal electrodes is located at a different one of said side surfaces.

11. A monolithic capacitor, comprising:

a capacitor body in the form of a parallelepiped having two opposing principle surfaces and four side surfaces extending between said principle surfaces, said capacitor body including a plurality of dielectric layers extending in a direction generally parallel to said principle surfaces and at least a pair of opposed first and a second inner electrodes each in the shape of quadrilateral, said first and second inner electrodes facing one another via a respective one of said dielectric layers so as to form a capacitor unit; and first, second, third and fourth external corner terminal electrodes located at respective corners of said capacitor body where adjacent said side surfaces intersect;

n external side surface terminal electrodes, each of said external side surface terminal electrodes being located at an associated one of said side surfaces of said capacitor body, n being an integer greater than or equal to one;

first, second and third lead electrodes extending from corresponding corners of said first inner electrode to said first, second and third external corner terminal electrodes, respectively; and n additional lead electrodes, each of said lead electrodes extending from said second inner electrode to a respective one of said n external side surface terminal electrodes.

12. A monolithic capacitor according to claim 11, further including a further lead electrode which extends from a corner of said second inner electrode to said fourth external corner electrode so as to electrically connect said second inner electrode to said fourth external corner electrode.

13. A monolithic capacitor according to claim 12, wherein said n external terminal electrodes are located at the side surfaces of said capacitor body which extend between said first and second and said second and third external corner electrodes.

14. A monolithic capacitor according to claim 13 wherein n is 2.

15. A monolithic capacitor according to claim 11, wherein n is 2.

16. A monolithic capacitor according to any one of claims 1–8 and 9–15, wherein said corners of said capacitor body are campfered.

17. A monolithic capacitor, comprising:

a capacitor body in the form of a parallelepiped having two opposing principle surfaces and four side surfaces extending between said principle surfaces, said capacitor body including a plurality of dielectric layers extending in a direction generally parallel to said principle surfaces and at least one pair of opposed first and second inner electrodes each in the shape of a quadrilateral, said first and second inner electrodes each in the shape of a quadrilateral, said first and second inner electrodes facing one another via a respective one of said dielectric layers so as to form a capacitor unit;

first, second, third and fourth external corner terminal electrodes located at respective corners of said capacitor body where adjacent said side surfaces intersect, said first and second external corner terminal electrodes being located at diagonally opposed corners of said capacitor body;

first and second lead electrodes extending from respective corners of said first inner electrode to said first and second external corner terminal electrodes, respectively, so as to electrically connect said first inner electrode to said first and second external corner terminal electrodes; and third and fourth lead electrodes extending from respective corners of said second inner electrode to said third and fourth external corner terminal electrodes, respectively, so as to electrically connect said second inner electrode to said third and fourth external corner terminal electrodes.

* * * * *